United States Patent
Brown

[15] 3,659,277
[45] Apr. 25, 1972

[54] RECEIVER-TRANSMITTER APPARATUS

[72] Inventor: Richard W. Brown, Excelsior, Minn.

[73] Assignee: Control Data Corporation, Minneapolis, Minn.

[22] Filed: June 18, 1970

[21] Appl. No.: 47,288

[52] U.S. Cl.............................................340/203, 340/210
[51] Int. Cl......................................................G08c 19/26
[58] Field of Search.................................340/210, 203, 206

[56] References Cited

UNITED STATES PATENTS

| | | | |
|---|---|---|---|
| 2,897,486 | 7/1959 | Alexander | 340/203 |
| 2,942,112 | 6/1960 | Hearn | 340/206 |
| 2,994,825 | 8/1961 | Anderson | 340/203 |
| 3,067,941 | 12/1962 | Marlot | 340/206 |
| 3,068,458 | 12/1962 | Hansson | 340/206 |
| 3,132,329 | 5/1964 | Penter | 340/206 |

Primary Examiner—Thomas B. Habecker
Attorney—Richard P. Ulrich, Thomas G. Devine, Joseph A. Genovese and Paul L. Sjoquist

[57] ABSTRACT

A combination of a remotely located transmitter and a local receiver. The transmitter, which receives its power from the receiver, provides an output pulse train the repetition rate of which is proportional to the amplitude of the signal of the transmitter input. The receiver in turn generates an output signal, which is proportional to the repetition rate of the input pulse train received from the transmitter.

5 Claims, 3 Drawing Figures

INVENTOR.
RICHARD W. BROWN
BY
ATTORNEY

INVENTOR.
RICHARD W. BROWN

INVENTOR.
RICHARD W. BROWN
BY
ATTORNEY 3,659,277

RECEIVER-TRANSMITTER APPARATUS

BACKGROUND OF THE INVENTION

This invention is intended for use in telemetering applications and more particularly for use in telemetering applications when no source of power is available at the remote transmitter site.

Heretofore, the current flowing through the transmission line connecting the transmitter and receiver has been made responsive to variations in the metered quantity when no power source was available at the transmitter. However, the current loop suffers from inaccuracy with changing ambient conditions which vary the resistance of the transmission line. This invention overcomes that problem by sensing pulse transitions instead of current levels thereby providing a telemetering installation which requires no power source at the transmitter and is substantially unaffected by line resistance variations.

SUMMARY OF THE INVENTION

As indicated above no system of which I am aware uses a pulse train, the repetition rate of which is dependent upon the input signal to the transmitter. Furthermore no system of which I an aware uses a non-powered remote station in conjunction with pulse repetition rate transmission.

Therefore, it is an object of this invention to provide a non-powered remote station.

It is an additional object of this invention to provide a non-powered remote station which provides an output pulse train the repetition rate of which is dependent upon the signal received on its input.

Another object of this invention is to provide the means for conveying telemetered information to a receiver which is unaffected by changes in transmission line resistance.

Another object of this invention is to provide the means for converting a voltage level to a train of pulses in a transmitting device and reconverting the pulse train to a signal level in a receiving device wherein the signal level is dependent upon the repetition rate of the pulses received at the input to the device.

It is another object of this invention to provide remote transmitter means which is insensitive to the polarity of voltage impressed on the conducting means connecting the unpowered transmitter means and the receiving means.

It is an additional object of this invention to substantially reduce the impedance of the terminating means of the transmission line connecting the remote transmitter and the receiver in a manner determined by the signal level at the input to the transmitter.

DRAWINGS

DESCRIPTION OF THE PREFERRED EMBODIMENT

Figure 1:
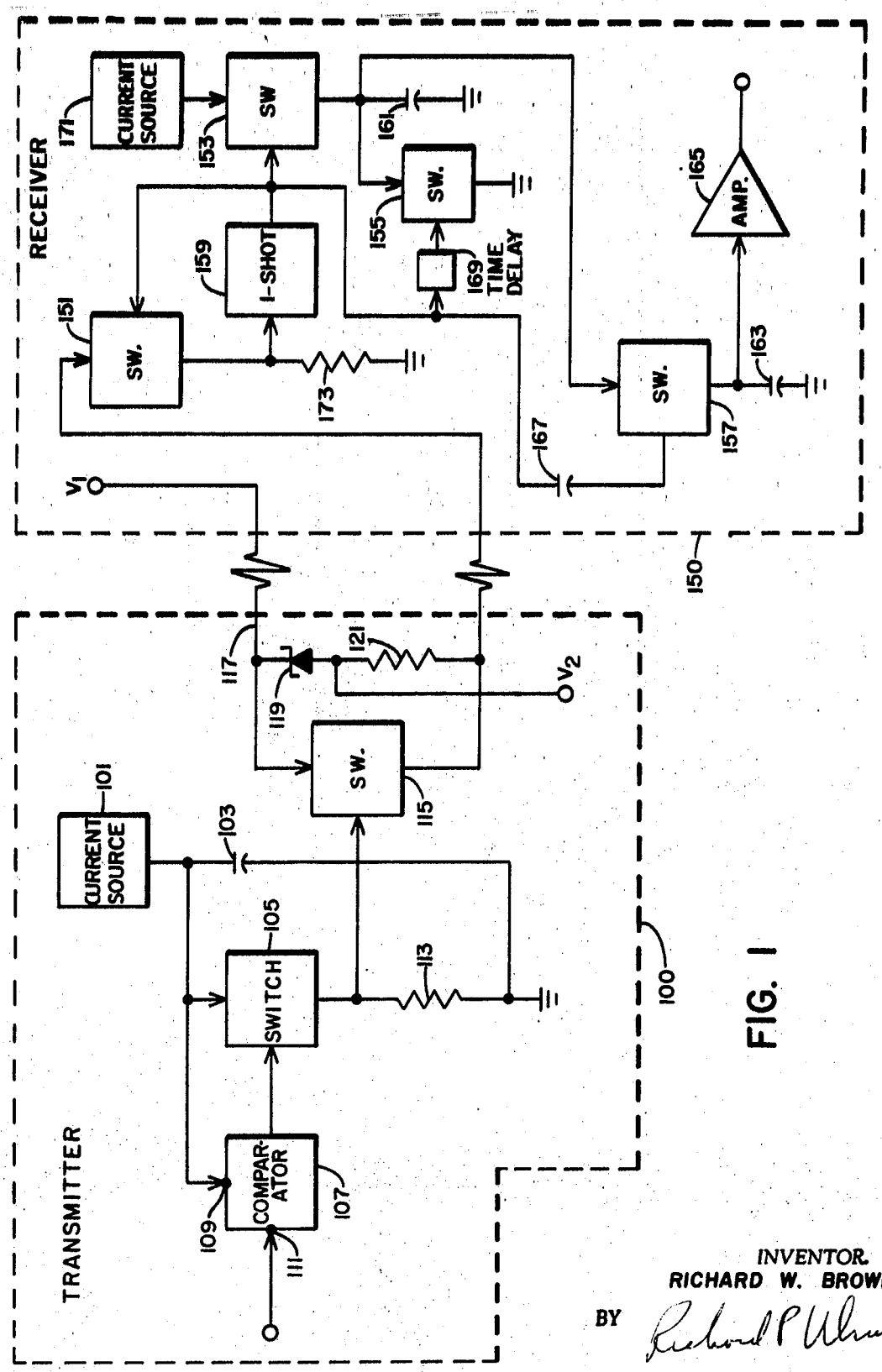
FIG. 1 is a block diagram showing the functional blocks employed in the transmitter-receiver apparatus.

With reference to Figure 1, the remote transmitter means is enclosed in broken lines and is generally labeled 100. Local receiver means is enclosed in broken lines and is generally labeled 150. Current source 101 provides approximately a constant charging current to capacitor 103 so that the voltage across capacitor 103 is proportional to the time which has elapsed since the current from current source 101 has been allowed to charge capacitor 103. The time period begins when switch 105 opens. The time period ends when comparator 107 provides an output signal indicating that the level at input 109 has reached the level of input 111. The signal on input 111 is derived from the quantity to be monitored. For example, pressure could be monitored by providing a transducer which varies the movable element of a potentiometer with change in pressure, thereby converting change in pressure into change in signal level at pin 111. When the signal at 111 is equal to the signal at 109, an output signal issues from comparator 107. This output signal closes switch 105 thereby discharging capacitor 103 and developing a signal across resistor 113. The signal developed across resistor 113 closes switch 115. When switch 115 is open the voltage across transmission line 117 may be between 20 and 40 volts depending on transmission line resistance and the voltage across zener diode 119 maybe approximately 10 volts. This voltage labeled V2 in Figure 1 is the voltage source for the circuitry of the remote transmitter. When switch 115 closes the impedance across switch 115 becomes very low, effectively shorting zener diode 119 and resistor 121, thereby increasing the current demanded by the transmitter from the receiver.

The increased current required because switch 115 has closed, is supplied by power supply V1 located in receiver 150. Assume that switch 151 is closed, switch 153 is closed, switch 155 is open and switch 157 is open when switch 115 closes shorting out line 117. The first effect of closing switch 115 is to trigger monostable multivibrator 159, which will change state and cause switch 151 to open, switch 153 to open and switch 157 to close. When switch 151 opens the current in transmission line 117 drops to zero thereby reducing voltage source V2 to zero. When voltage V2 goes to zero, switches 105 and 115 open. Opening switch 105 allows capacitor 103 to begin to recharge from current source 101 as soon as power source V2 is reestablished. Opening switch 115 removes the shorted condition from transmission line 117 and enables the restoration of power supply V2 when current is restored in transmission line 117. Current will begin to flow in line 117 when switch 151 closes. Switch 151 will reclose when the one-shot multivibrator 159 returns to its original state. In the meantime, the voltage level on capacitor 161 is transferred to capacitor 163 through closed switch 157. This level is sent to a utilization device through operational amplifier 165. After the signal across capacitor 161 has been transferred to capacitor 163, switch 157 opens. Capacitor 167 is used to indicate schematically that switch 157 responds to a transition not a level. A period of time, determined by the setting of delay 169, after the transfer from capacitor 161 to 163, switch 155 closes thereby discharging capacitor 161. Since delay 169 is sufficiently long to allow switch 157 to reopen, capacitor 163 is not discharged. As indicated earlier switch 151 recloses when one shot 159 returns its original state. When 151 closes, current is reestablished in transmission line 117 thereby reestablishing power source V2 and restarting the entire sequence of operation.

Although the embodiment shown in FIG. 1 accepts an analog input at the transmitter and reconverts the intermediate pulse into an analog output signal, it is not my intention to forclose the use of the pulse train to deliver a digital output as opposed to an analog output. For example, the pulse train received at the input of the receiver means could be used to drive an ordinary digital counter which is reset with the leading edge transition of each pulse. In this way the count present between leading edge transitions would reflect the frequency of the pulse train and consequently the amplitude of the input signal to the transmitter.

Figure 2:
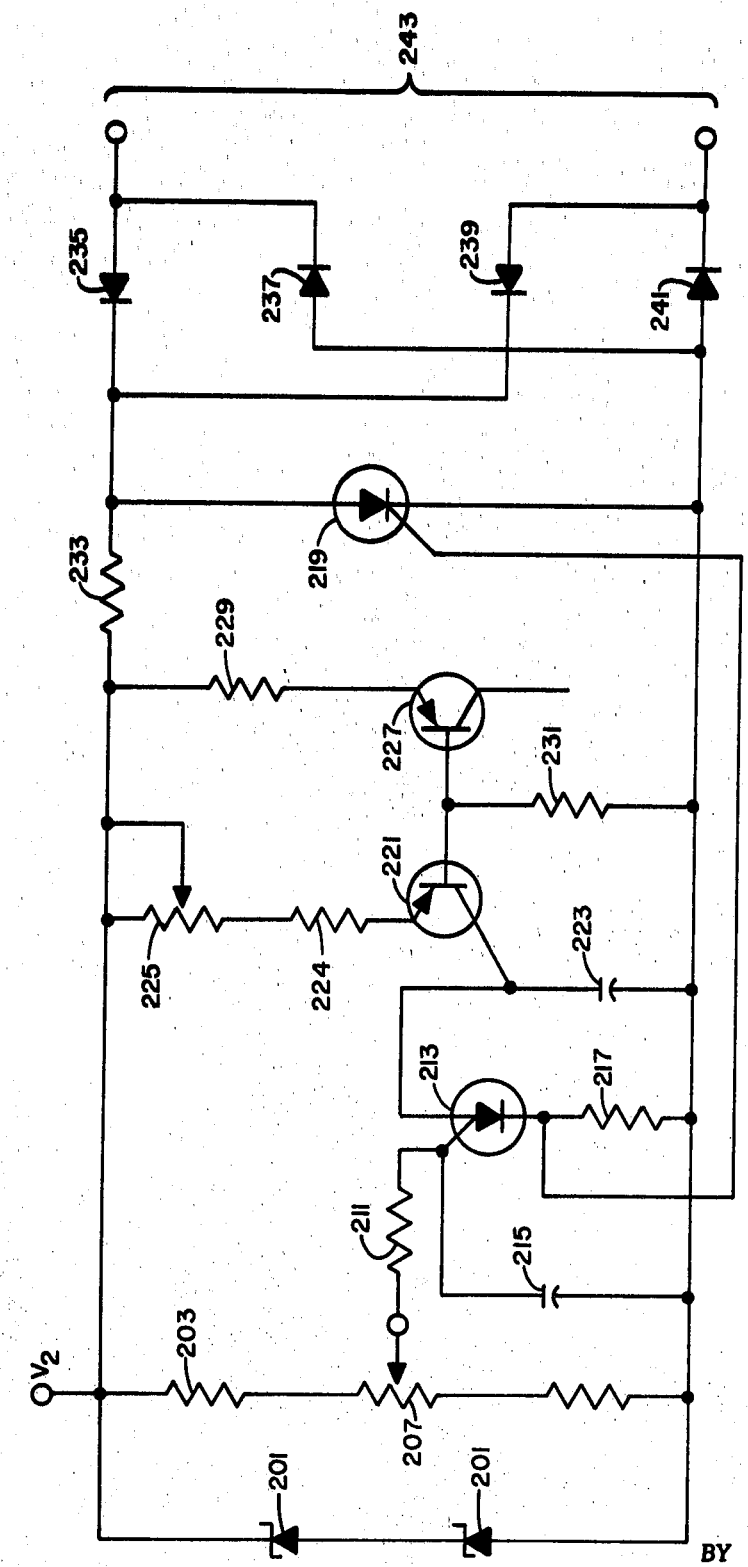
FIG. 2 is a schematic circuit diagram of an embodiment of a transmitter employed in this invention.
Figure 3:
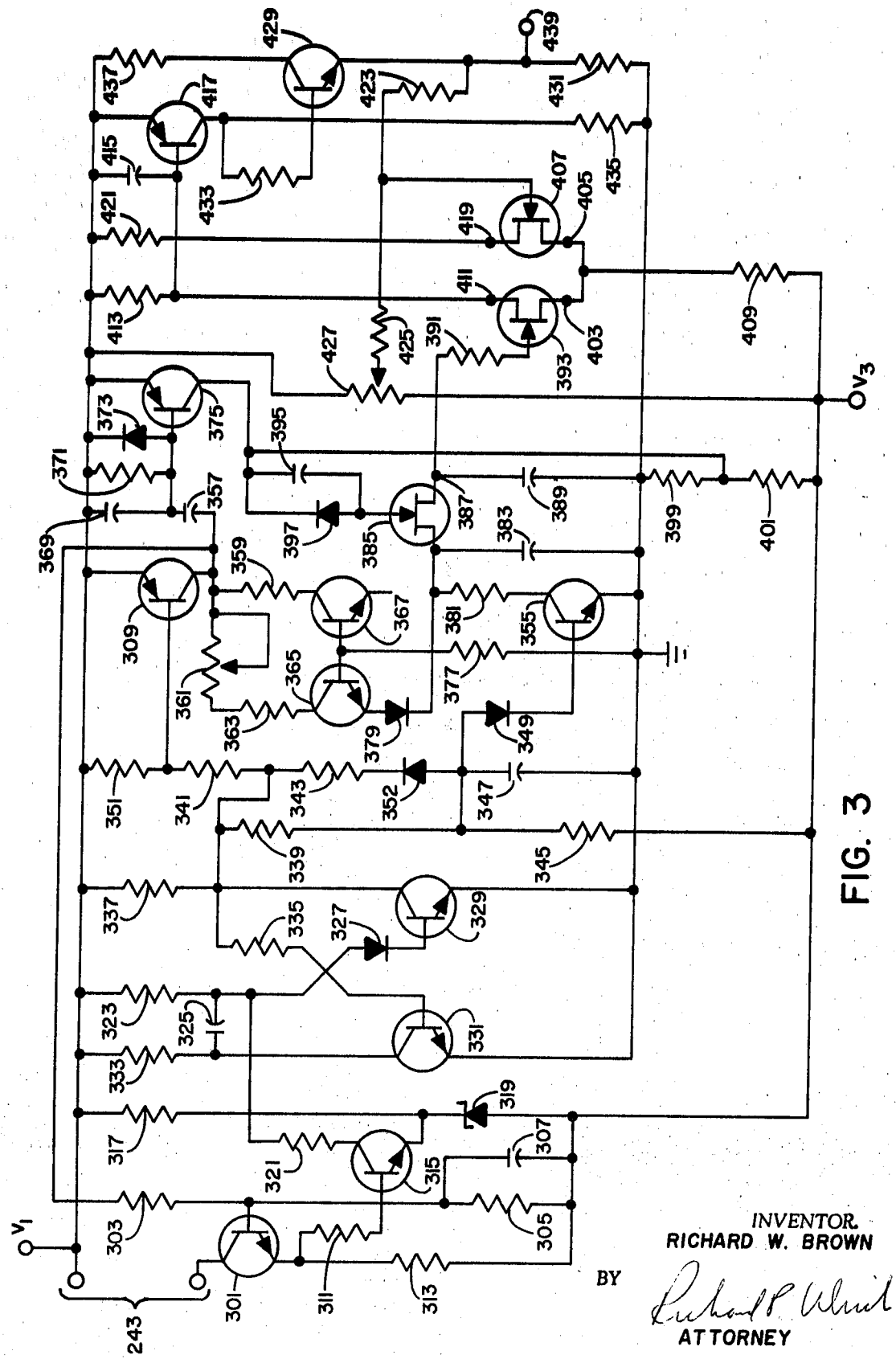
FIG. 3 is a circuit schematic of a receiver.

An embodiment of this invention is shown in more detail in FIGS. 2 and 3. With reference to FIG. 2, a pair of zener diodes connected in series and labeled 201 are connected in parallel with the series combination of resistor 203, resistor 205, and potentiometer 207. The bus labeled V2 is the same voltage bus designated V2 in FIG. 1. The return bus has been designated 209. Resistor 211 is connected to the movable contact of potentiometer 207 on one end and on the other end to the anode gate of silicon controlled switch 213. Capacitor 215 is also connected between the anode gate of silicon controlled switch 213 and reference bus 209. The cathode of silicon control switch 113 is connected to one end of resistor 217 and also to the cathode gate of silicon controlled rectifier 219. The other end of resistor 217 is connected to bus 209. The anode of switch 213 is connected to the collector of transistor 221. The collector of transistor 221 is also connected to one side of capacitor 223. The other side of capacitor 223 is connected to bus 209. The emitter of transistor 221 is connected to the series combination of resistor 224 and potentiometer 225. The other end of potentiometer 225 is connected to bus V2. The movable contact of potentiometer 225 is also connected to bus V2. The base of transistor 221 is connected to the base of transistor 227 and also to one end of resistor 231. The other end of resistor 231 is connected to common bus 209. The emitter of transistor 227 is connected to one end of resistor 229 while the other end of resistor 229 is connected to bus V2. One end of resistor 233 is connected to bus V2 while the other end of resistor 233 is connected to the anode of rectifier 219. The cathode of rectifier 219 is connected to bus 209. Diodes 235, 237, 239 and 241 are connected to form a full wave bridge rectifier which is connected across transmission line conducting means 243. The bridge rectifier makes the circuitry insensitive to the polarity of the voltage impressed on transmission line 243.

With reference to FIG. 3 the input is received over transmission line 243 (the same designator has been used in FIG. 2). Bus V1, may be a positive 24 volts while bus V3 may be a negative 15 volts. The collector of transistor 301 is connected to one conductor of transmission line 243. The base of transistor 301 is connected to one end of resistor 303, one end of resistor 305, and one end of capacitor 307. The other ends of resistor 305 and capacitor 307 are connected to bus V3, while the other end of resistor 303 is connected to the collector of transistor 309. The emitter of transistor 301 connected to the juncture of resistors 311 and 313. The other end of resistor 313 is connected to bus V3 while the other end of resistor 311 is connected to the base of transistor 315. The emitter of transistor 315 is connected to the junction between resistor 317 and the cathode of zener diode 319. The anode of zener diode 319 is connected to bus V3 while the other end of resistor 317 is connected to bus V1. The collector of transistor 315 is connected to one end of resistor 321 while the other end of resistor 321 is connected to the juncture of one end of resistor 323, one end of capacitor 325 and the anode of diode 327. The other end of resistor 323 is connected to bus V1 while the cathode of diode 327 is connected to the base of transistor 329. The other end of capacitor 325 is connected to the juncture between the collector of transistor 331 and one end of resistor 333. The other end of resistor 333 is connected to bus V1. The emitters of transistors 329 and 331 are connected to the reference voltage. The base of transistor 331 is connected to one end of resistor 335, the other end of resistor 335 is connected to the juncture of the collector of transistor 329, one end of resistor 337, one end of resistor 339, one end of resistor 341 and one end of resistor 343. The other end of resistor 337 is connected to bus V1, the other end of resistor 339 is connected to the junction of resistor 345, capacitor 347, the anode of diode 349, and the anode of diode 352. The other end of resistor 343 is connected to the cathode of diode 351. The other end of resistor 341 is connected to the juncture of one end of resistor 351 and the base of transistor 309. The other end of resistor 351 is connected to bus V1 while the other end of resistor 345 is connected to bus V3. The other end of capacitor 347 is connected to reference while the cathode of diode 349 is connected to the base of transistor 355. The emitter of transistor 309 is connected to bus V1 while the collector of 309 is connected to the junction of the other end of resistor 303, one end of capacitor 357, one end of resistor 359 and one end of resistor 361. The other end of resistor 361 is connected to one end of resistor 363 while the other end of resistor 363 is connected to the emitter of transistor 365. The other end of resistor 359 is connected to the emitter of transistor 367. The other end of capacitor 357 is connected to the junction of one end of capacitor 369, one end of resistor 371, and the anode of diode 373, and the base of transistor 375. The other end of capacitor 369, resistor 371 and the cathode of diode 373 are connected to bus V1. The base of transistor 365 is connected to the base of transistor 367 and also to one end of resistor 377. The other end of resistor 377 is connected to reference. The collector of transistor 365 is connected to the anode of diode 379 while the cathode of diode 379 is connected to the junction of one end of resistor 381, one end of capacitor 383, and one terminal of field effect transistor 385, the other end of resistor 381 is connected to collector of transistor 355 while the emitter of transistor 355 is connected to reference. The other end of capacitor 383 is also connected to reference. Terminal 387 of field effect transistor 385 is connected to the junction of one end of capacitor 389 and resistor 391. The other end of capacitor 389 is connected to reference while the other end of resistor 391 is connected to the gate of field effect transistor 393. The gate of field effect transistor 385 is connected to the juncture of one end of capacitor 395 and the anode of diode 397. The other end of capacitor 395 is connected to the juncture of the cathode of diode 397, the collector of transistor 375, one end of resistor 399, and one end of resistor 401. The other end of resistor 399 is connected to reference, while the other end of resistor 401 is connected to bus V3. The emitter of transistor 375 is connected to bus V1. Terminal 403 of field effect transistor 393 is connected to terminal 405 of field effect transistor 407 and also to one end of resistor 409. The other end of resistor 409 is connected to bus V3. Terminal 411 is connected to the junction of one end of resistor 413, one end of capacitor 415, and the base of transistor 417. The other ends of resistor 413 and capacitor 415 are connected to bus V1. Terminal 419 of field effect transistor 407 is connected to one end of resistor 421. The other end of resistor 421 is connected to bus V1. The gate of transistor 407 is connected to the juncture of resistor 423 and resistor 425. The other end of resistor 425 is connected to the movable contact of potentiometer 427. One end of potentiometer 427 is connected to bus V1 while the other end of potentiometer 427 is connected to bus V3. The other end of resistor 423 is connected to the junction of the emitter of transistor 429, and one end of resistor 431. The base of transistor 429 is connected to one end of resistor 433 while the other end of resistor 433 is connected to the junction of the collector of transistor 417 and one end of resistor 435. The other end of resistor 435 is connected to reference. The emitter of transistor 417 is connected to VI. The collector of transistor 429 is connected to one end of resistor 437 while the other end of resistor 437 is connected to bus VI. Output terminal 439 is also connected to the emitter of transistor 429.

OPERATION 200 series numbers are used in FIG. 2 while 300 series numbers are used in FIG. 3.

With reference to FIG. 3, the following initial conditions are assumed to exist:

Power source V1 is assumed to be a plus 24 volt power supply, and power source V3 is assumed to be a minus 15 volt power supply.

Transistor 329 is assumed to be conducting, and capacitor 383 is assumed to be discharged.

With reference to FIG. 2 diodes 201 are assumed to be 5 volt zener diodes so that V2 is a 10 volt supply. Capacitor 223 is assumed to be discharged. Silicon control switch 213 and silicon control rectifier 219 are assumed to be nonconducting.

Returning to FIG. 3, since transistor 329 is conducting transistor 309 conducts thereby providing a termination for voltage divider 303, and 305. When 309 conducts capacitor 383 begins to charge through the current source comprising transistors 365 and 367. Transistors 355 and 375 are both cut off. Since transistor 375 is cut off field effect transistor 387 is nonconducting thereby providing a high impedance path between capacitor 383 and capacitor 389. With the assumed conditions the base of transistor 301 will tend to rise to approximately minus 7 volts. However, it is prevented from so doing by the emitter which is at a level of approximately minus 12 volts. The 12 volt level at the emitter clamps the base to a level slightly more positive then minus 12 volts. As shown in FIG. 2 the collector load of transistor 301 may be approximated by an 8,200 ohm resistor in series with a 10 volt supply. Therefore, a rough approximation of the collector current flowing through transistor 301 is 3 milliamps. With a 3 milliamp current flowing through 301 the drop across resistor 313 is approximately 3 volts. Consequently, the level at the emitter of 301 is minus 12 volts. Assuming that diode 319 is a 5 volt zener diode, the base of transistor 315 will be reversed biased and 315 cut-off. Returning to FIG. 2, capacitor 223 continues to charge until the voltage developed across capacitor 223 and consequently the voltage at the anode of switch 213 is equal to the voltage at the gate of switch 213. The level at the gate of switch 213 is controlled by the setting of potentiometer 207. The setting of potentiometer 207 is in turn controlled by the transducer monitoring the pressure or other quantity being metered. When the voltage on the gate and anode are approximately equal, switch 213 conducts. When 213 conducts, silicon controlled rectifier 219 conducts, thereby, impressing a low impedance across transmission line 243. When the impedance of 243 drops, transistor 301 no longer remains in saturation and the current through the emitter-collector path increases. However, the extent of that increase is limited by the base of transistor 301 which will rise to approximately minus 7 volts. As the current through resistor 313 rises, the voltage across resistor 313 rises until an equilibrium point is established which is slightly more negative then the voltage on the base. Since the base of transistor 315 has become positive with respect to its emitter, transistor 315 conducts thereby cutting off transistor 329 and forcing transistor 331 to conduct. When current flow through transistor 329 ceases its collector rises to approximately the level of VI and cuts off transistor 353. Cutting off transistor 353 stops current flow through current source 365 and also opens up one end of the voltage divider supplying the base of transistor 301. Transistor 301 in turn cuts off thereby extinguishing the current flow through silicon controlled rectifier 219 and switch 213. In addition to the actions mentioned above, when transistor 309 stops conducting, transistor 375 conducts for a period of time during which capacitor 357 is charging. In a typical case this time period maybe 2 milliseconds. When transistor 375 conducts it enables the gate of transistor 385. When the gate of 385 is enabled, 385 becomes a low impedance path through which capacitor 389 charges to approximately the level of capacitor 383. In a typical embodiment of this invention capacitor 383 may be 35 microfarads while capacitor 389 may be 0.68 microfarads. The remainder of the circuit including transistors 393, 407, 417, and 429 is an operational amplifier with zero adjustment which is old in the art. Since this portion of the circuit is old in the art, it will not be described further except to point out that it also provides voltage translation.

Transistor 355 conducts sometime after transistor 329 stops conduction. The elapsed time depends upon the time constant of the base circuit of transistor 355. Typically 355 will conduct 10 milliseconds after 329 ceases to conduct. When 355 conducts it discharges capacitor 383. The monostable multivibrator (331 and 329) will return to its stable state after capacitor 383 is discharged. Typically it may return after one-half second. When it does return, the assumed initial conditions have been reestablished.

Typical values of the components of the circuit are:

Zener diode:
  201—1N751A
Resistors:
  203—4,990 ohms, 1%
  205—4,020 ohms, 1%
  207—10 K-ohms, 5%
  211—10 K-ohms, 5%
  217—100 ohms, 5%
  224—20 K-ohms, 1%
  225—20 K-ohms, 5%
  229—40.2 K-ohms, 1%
  231—150 K-ohms, 5%
  233—8.2 K-ohms, 5%
  303—33 K-ohms, 5%
  305—8.2 K-ohms, 5%
  311—1 K-ohm, 5%
  313—1 K-ohm, 5%
  317—18 K-ohms, 5%
  321—27 K-ohms, 5%
  323—100 K-ohms, 5%
  333—4.7 K-ohms, 5%
  335—100 K-ohms, 5%
  337—4.7 K-ohms, 5%
  339—40 K-ohms, 5%
  341—22 K-ohms, 5%

Zener diode:
  319—1N751A
Resistors:
  343—100 ohms, 5%
  345—47 K-ohms, 5%
  351—2.2 K-ohms, 5%
  359—18 K-ohms, 5%
  361—20 K-ohms, 5%
  363—2.2 K-ohms, 5%
  371—2.2 K-ohms, 5%
  377—330 K-ohms, 5%
  381—100 ohms, 5%
  391—1 megaohm, 5%
  399—15 K-ohms, 5%
  401—10 K-ohms, 5%
  409—150 K-ohms, 5%
  413—10 K-ohms, 5%
  421—10 K-ohms, 5%
  423—100 K-ohms, 5%
  425—330 K-ohms, 5%
  427—50 K-ohms, 5%
  431—1 megaohm, 5%
  433—1 K-ohm, 5%
  435—10 K-ohms, 5%
  437—470 ohms, 5%

Diodes:
  235—1N458 silicon
  237—1N458 silicon
  239—1N458 silicon
  241—1N458 silicon
  327—1N458 silicon Diodes:
  349—1N458 silicon
  352—1N458 silicon
  373—1N458 silicon
  379—1N458 silicon Transistors:
  221—Silicon 2N3906
  227—Silicon 2N3906
  309—Silicon 2N3906
  365—Silicon 2N3906
  367—Silicon 2N3906
  375—Silicon 2N3906
  417—Silicon 2N3906

Transistors:
  301—Silicon 2N3904
  315—Silicon 2N3904
  329—Silicon 2N3904
  331—Silicon 2N3904
  355—Silicon 2N3904
  429—Silicon 2N3904

Capacitors:
  215—1 microfarad
  223—35 microfarad
  307—.056 microfarad
  325—4.7 microfarad
  347—.68 microfarad Capacitors:
  357—.68 microfarad
  369—.01 microfarad
  383—35 microfarad
  389—.68 microfarad
  415—15 microfarda Silicon controlled switch 213—GE 3N84
Silicon controlled rectifier 219—TIC 45
Field Effect Transistors:
  385—2N3819—Silicanix E101
  393—2N3819—Silicanix E101
  407—2N3819—Silicanix E101

I claim:

1. Apparatus for locally generating a signal following a remote analog signal, and having a remote transmitter and a local receiver connected by a transmission line, wherein the receiver comprises:
   a. a voltage supply;
   b. means for connecting the voltage supply to the transmission line;
   c. current detecting means connected to the transmission line for sensing transmission line current level changes and issuing an output signal having a level dependent on the time interval between changes; and wherein the transmitter comprises:
   d. power supply means receiving voltage from the transmission line for supplying operating power;
   e. variable impedance means connected across the transmission line for causing change in transmission line current at intervals dependent on the level of the remote analog signal, comprising:
      aa. means for generating a signal having a level increasing proportional to elapsed time;
      bb. comparing means receiving the elapsed time signal and the analog input signal for generating an output signal when the level of the analog input signal is approximately equal to the corresponding level of the elapsed time signal;
      cc. switching means, connected across a transmission line and having a first impedance, and a second impedance lower than the first, and selectable responsive to the output signal from the comparing means, for changing the current flowing through the transmission line from the power supply means in response to the signal from the comparing means; and dd. means controlling the elapsed time signal generating means, receiving the output signal from the comparing means, for resetting the elapsed time interval signal to a predetermined value upon receipt of a signal from the comparing means.

2. The apparatus of claim 1 wherein the receiver further comprises:
   a. means for generating a pulse of predetermined width in response to a change in transmission line current;
   b. means for generating a signal having a level increasing proportional to elapsed time;
   c. means connected to the pulse generating means and the elapsed time signal generating means, for storing the elapsed time signal to a predetermined level in response to the pulse of predetermined width;
   d. amplification means, receiving the elapsed time signal, for producing the output signal with a level varying with each peak attained by the output of the elapsed time signal generating means.

3. Apparatus for locally generating a signal following a remote analog signal, and having a remote transmitter and a local receiver connected by a transmission line, wherein the receiver comprises:
   a. a voltage supply;
   b. means for connecting the voltage supply to the transmission line;
   c. current detecting means connected to the transmission line for sensing transmission line current level changes and issuing an output signal having a level dependent on the time interval between changes; and wherein the transmitter comprises:
   d. variable impedance means connected across the transmission line for causing change in transmission line current at intervals dependent on the level of the remote analog signal, comprising:
      aa. a capacitor;
      bb. a current source connected to the capacitor for charging the capacitor at a predetermined rate;
      cc. variable voltage generating means receiving the analog input signal, for producing a voltage following the level of the analog input signal;
      dd. comparator means having a first input receiving the voltage across the capacitor, and a second input receiving the output of the variable voltage generating means for providing an output signal when the voltage across the capacitor equals the variable voltage;
      ee. a full wave rectifier bridge connected across the output of the transmission line and making the transmitter insensitive to the polarity of the voltage supply; and
      ff. switching means having its output terminals connected across the bridge and receiving the output of the comparator means for providing a low impedance path across the transmission line responsive to the output signal of the comparator means, and a high impedance path across the transmission line otherwise;
   e. power supply means receiving voltage from the transmission line for supplying operating power to the variable impedance means.

4. The apparatus as claimed in claim 1 wherein the receiver current detecting means comprises:
   aa. a first capacitor;
   bb. a current source connected to the first capacitor for charging the first capacitor at a predetermined rate responsive to a charging signal;
   cc. a second capacitor;
   dd. first switching means for connecting the first capacitor across the second capacitor responsive to a connect signal;
   ee. amplification means following the signal across the second capacitor for supplying the output signal;
   ff. second switching means connected across the first capacitor for discharging the capacitor responsive to a discharge signal;
   gg. a monostable multivibrator entering its set condition for a predetermined time responsive to an input signal pulse, supplying the charging signal to the current source while in its reset condition and supplying the connect signal and the discharge signal with the first and second switching means respectively while in its set condition; and
   hh. third switching means for disconnecting the voltage supply from the transmission line responsive to the set condition of the multivibrator and for connecting the power supply means to the transmission line responsive to the reset condition of the multivibrator.

5. The apparatus of claim 4 wherein the elapsed time signal generating means of the variable impedance means further comprises:
   aa. a capacitor;
   bb. a current source connected to the capacitor for charging the capacitor at a predetermined rate;
   cc. variable voltage generating means receiving the analog input signal for producing a voltage following the level of the analog input signal.

* * * * *